United States Patent [19]

Long

[11] 4,117,183

[45] Sep. 26, 1978

[54] STARCH-COATED PAPER AND GYPSUM WALLBOARD PREPARED THEREWITH

[75] Inventor: William J. Long, Chicago, Ill.

[73] Assignee: United States Gypsum Company, Chicago, Ill.

[21] Appl. No.: 770,149

[22] Filed: Feb. 18, 1977

Related U.S. Application Data

[63] Continuation-in-part of Ser. No. 491,097, Jul. 23, 1974, Pat. No. 4,051,291, which is a continuation of Ser. No. 221,324, Jan. 27, 1972, abandoned.

[51] Int. Cl.² .......................... B32B 7/14; B05D 5/00; B32B 31/12; C09J 7/02
[52] U.S. Cl. ..................... 428/201; 156/39; 156/44; 156/336; 427/286; 427/288; 428/211; 428/350; 428/355; 428/532; 428/538
[58] Field of Search ............... 428/198, 211, 350, 355, 428/532, 533, 534, 535, 538, 201; 156/39, 44, 336; 427/286, 288

[56] References Cited

U.S. PATENT DOCUMENTS

| | | | |
|---|---|---|---|
| 3,458,336 | 7/1969 | Newman | 427/286 |
| 3,503,782 | 3/1970 | Ayres | 427/286 |

FOREIGN PATENT DOCUMENTS 1,233,762  2/1967  Fed. Rep. of Germany.

*Primary Examiner*—William R. Dixon, Jr.
*Attorney, Agent, or Firm*—Samuel Kurlandsky; Robert H. Robinson; Kenneth E. Roberts

[57] ABSTRACT

A composition comprising water, finely particulate gypsum and starch is coated on a paper cover sheet in a selective pattern such that the starch composition is disposed only at limited areas of the bond liner surface, and wherein substantial areas of the bond liner surface are free of the coating; the coated paper, either in the wet stage or after drying being used as paper cover sheets to form gypsum wallboard by applying an aqueous slurry of calcined gypsum, which may be free of starch, to the coated surface and setting the gypsum, resulting in a gypsum wallboard having excellent adhesion between the paper cover sheets and the gypsum core.

60 Claims, 4 Drawing Figures

STARCH-COATED PAPER AND GYPSUM WALLBOARD PREPARED THEREWITH

RELATED APPLICATIONS

This application is a continuation-in-part of copending application U.S. Ser. No. 491,097, filed July 23, 1974, now U.S. Pat. No, 4,051,291 which in turn is a continuation of U.S. Ser. No. 221,324, filed Jan. 27, 1972, now abandoned, all of these of the present inventor.

BACKGROUND OF THE INVENTION (1) Field of Invention

The present invention relates to gypsum wallboard and more particularly refers to a method for coating the bond liner surface of a paper cover sheet with a starch adhesive composition in a selected pattern, to the product formed thereby, and to gypsum wallboard formed by applying a calcined gypsum slurry to the coated bond liner surface of the paper cover sheet.

(2) Description of the Prior Art

Conventional wallboard manufacture has in the past been based on the theory that the wet and dry bond were one and the same, that the paper-to-core bond was mechanical and crystalline, and that drying calcined the crystalline bond to the point that the bond was essentially destroyed. To prevent this, starch was usually introduced into the core slurry and permitted to migrate to the paper-core interface to protect the gypsum crystals forming the mechanical bond. In contrast to this, it was disclosed in U.S. Ser. No. 491,097 of which this application is a continuation-in-part, that the paper-to-core bond actually proceeds in a two-step fashion, as follows. When the slurry is cast onto the paper cover sheets, and specifically the bond liner thereof, wet or green bonding will occur between the bond liner and the slurry due to hydrogen bonding, unless the paper is treated to prevent such hydrogen bonding. For example, any bond liner sizing tends to reduce such hydrogen bonding, and any film completely coating the liner eliminates the hydrogen bonding altogether. Upon drying the board in conventional high temperature kilns, no matter to what degree wet bonding existed prior to drying, it is all destroyed during drying. Thus, for dry bond to take place, a replacement for the destroyed hydrogen bonds must be introduced. Since the dry bond takes place between the bond liner and the gypsum core, the adhesive must be maintained at the paper-core interface until it cures or sets.

It was generally found that the adhesive must be coated upon the bond liner of the cover sheet in such a manner as to permit and maintain wet bonding of the cover sheet during the casting of the wallboard. This required that the adhesive must be non-film forming until it cures, and must be for that reason applied in a discontinuous manner in order that a substantial area of the bond liner surface remains uncoated. The adhesive must further be one which will not migrate from the paper-core interface during the casting and drying of the wallboard, and yet one which will set or cure during the drying before the wet bond has been completely destroyed. As a result of the interplay of wet bonding and subsequent dry bonding, a wallboard is formed which, when dry, retains the adhesive in a discontinuous or spaced-apart or partially covered pattern at the core-to-paper interface, because of the non-migratory nature of the adhesive.

It was previously found that certain uncooked or raw starches and other adhesives are in fact non-migratory and therefore do not spread to completely cover the surface of the cover sheets, but leave substantial areas uncoated and free of the adhesive. Consequently a wallboard paper-to-core bond is formed which is uniformly free of "peelers" and paper "blows".

As disclosed in the prior application referred to above, it was found that when a slurry of raw starch was coated on a paper cover sheet in a discontinuous pattern and in such a manner that substantial areas of the cover sheet were left uncoated even when dry, it was found that the thus coated cover sheets could be utilized either in the wet or dried stage to form gypsum wallboard by applying an aqueous calcined gypsum slurry which itself did not contain starch to the coated paper cover sheets.

In seeking convenient commercial methods for preparing the starch-coated paper cover sheets, it was found that an excellent product could be produced by means of a roller coater having spaced-apart annular ridges. However, because of the relatively low viscosity of the starch coating composition, it was found difficult to apply sufficient coating material without having the slurry creep over on areas which were desired to be left uncovered.

In preparing starch-coated paper having substantial areas free of starch it has been found that an excellent product can be produced by providing the starch coatings in the form of discrete and definite "striped" patterns or designs wherein the stripes are substantially parallel to each other. It was found that such patterns could be applied to paper with better control and reproduceability by means of a grooved, resilient applicator roll using a direct roll coater. However, in attempting to use a direct roll coater to apply the starch coating compositions disclosed in the above-mentioned application, U.S. Ser. No. 491,097, it was found that the coating material was not completely satisfactory for such application due in part to the properties of the composition, and due particularly to a low Brookfield viscosity of about 1000 cps. It became clear that compositions having higher viscosities and providing "stiffer" coatings were needed to maintain extended, continuous and trouble-free operations with the direct roll coater process. Original efforts to improve the physical properties of the coating composition to obtain a high viscosity were generally unsuccessful. When the proportion of starch was increased to obtain the necessary viscosity, this resulted in a coating of relatively dry character and which could not be utilized for forming a suitable coated paper by means of the direct roll coater. Moreover, an increase in the amount of dispersing agent to obtain a suitable viscosity resulted in the formation of a "gummy" coating which caused additional problems in the coating operation, as for example, extensive water holding capacities which affected both the drying rate of the coating on the paper as well as the imprinting operation, as for example, flowing of the coating on the total sheet which resulted in poor pattern definition and some overcoating of the areas intended to be free of the adhesive coating. Moreover, the use the additional dispersing agent resulted in a prohibitively high material cost.

SUMMARY OF THE INVENTION

Accordingly, it is an object of the invention to provide an improved paper-covered gypsum wallboard and process for making the same, wherein the bonding of the paper to the gypsm core is predictable and relatively unaffected by variances in the board-making process or components.

A further object of the invention is to provide such an improved wallboard and process which are substantially more economical due to the elimination of unnecessary amounts of the components.

A related object of the invention is to provide such an improved wallboard and manufacturing process wherein the bonding of the paper to the gypsum core is based solely upon an adhesive located only at the paper-core interface, which adhesive permits proper wet bonding of the paper sheet during the process.

Still another object is to provide such a process, and an improved cover sheet for gypsum wallboard, wherein the cover sheet is coated with an adhesive and which nevertheless is capable of being roll-wrapped and shipped to a board processing station.

It is still further an object to provide a paper bond liner or cover sheet coated with starch wherein the coating is applied and dried at limited areas of the paper and wherein substantial areas of the paper are free of starch.

It is still further an object to provide a coating composition for coating paper cover sheets with a starch adhesive having a viscosity within well defined limits, and which coating material can be used to provide coatings of certain limited areas adjacent areas free of coating, with well defined boundaries between them.

Still other objects and advantages will readily present themselves to one skilled in the art upon reference to the following specification and claims.

According to the invention it has been found that the bond liner of paper cover sheets may be provided with a superior starch coating of limited areas and having substantial areas of the paper uncoated by utilizing as a coating medium a composition comprising starch and calcium sulfate in finely particulate form. The calcium sulfate increases the viscosity of the coating composition within carefully controlled limits. The controlled viscosity permits coatings of fine boundary definition. This process results in a starch-coated paper bond liner which can be used with a calcined gypsum slurry to produce excellent gypsum wallboard having excellent paper adhesion.

DESCRIPTION OF THE PREFERRED EMBODIMENTS

Figure 1:
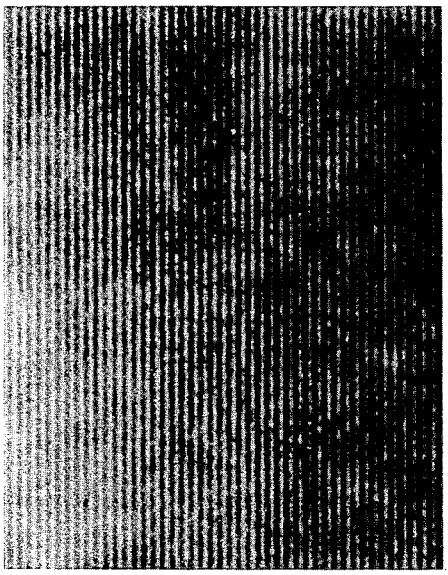
FIG. 1 is a photograph, in actual size, of a paper bond liner coated with starch with a composition of the present invention.

In carrying out the present invention a coating composition is first formed comprising calcium sulfate in a finely divided state, preferably calcined calcium sulfate or calcium sulfate hemihydrate. Very finely particulate calcium sulfate dihydrate may also be used. The composition additionally contains starch, preferably raw starch, sufficient water to make a slurry and other common additives such as dispersing agents and preservatives. Sufficient water is then added to form a slurry of the proper consistency. The composition is coated over paper cover sheets, preferably with a direct roll coater to form a plurality of parallel lines or stripes which are spaced apart. Because of the gypsum composition present in the slurry, a sufficiently high viscosity is obtained to enable lines or stripes having sharp edges or high resolution with respect to the uncoated areas. The coated paper may then be utilized either in the wet or subsequently dried stages to form gypsum wallboard by depositing a calcined gypsum slurry intermediate a pair of coated cover sheets.

The following examples are provided to illustrate preferred embodiments of the invention, but are not intended to be limiting in any manner.

In carrying out the procedures described in the following examples, the coating composition was applied to the paper by means of a 26 inch wide roll covered by a resilient material and grooved to provide sixteen annular V-grooves per inch of 0.010 inch depth. The width of the land of the grooves was 0.031 inch. The roll provided a pattern of parallel stripes along the length of the paper, with the width of the stripes being substantially equal to the space intermediate each pair of stripes. The coating operation comprised passing 25 inch wide paper sheets between the top grooved resilient roll and a bottom smooth resilient roll. The grooved roll rotated in a reservoir of liquid adhesive composition contained between a steel doctor roll and the grooved applicator roll. Metal endplate dams were used to hold an adhesive reservoir of approximately 800 grams. The steel doctor roll was adjusted free and/or in contact with the grooved roll to affect coating deposition from the grooves only. The amount of coating adhesive transferred from the applicator roll to the sheet was controlled by the pressure between the top applicator roll and the bottom resilient backing roll. The distance between the top and bottom roll is held to about 0.007 inch and the coating speed was about 100 ft. per minute.

The gypsum slurry utilized with the coated paper cover sheets in all the examples below was a conventional gypsum slurry comprising 600 parts of stucco (calcium sulfate hemihydrate), 500 parts water, 1.35 parts of an accelerator comprising calcium sulfate dihydrate finely ground together with 5% sugar based on the total accelerator by weight, 0.66 parts potassium sulfate, and sufficient conventional wood rosin foam to bring the density of the finished board to 1750 pounds per thousand square feet of one-half inch board.

In the tests described below, the effectiveness of the adhesion of the paper cover sheets to the gypsum core are given in terms of wet bond and dry bond. Wet bond is the measure of the adhesion of the paper surface to the wet cast gypsum board prior to entering the final drying stage which normally takes place in a drying kiln. Dry bond is a measure of the final attachment of the paper to the gypsum core after the board has progressed through the drying kiln.

In carrying out the testing in the laboratory, the laboratory boards are made 5 in. × 15 in. with each test strip made 3 in. × 5 in. with the machine direction in the 5 in. direction. The wet bond test is made ten minutes after the dry stucco is poured into the water in the mixture to form the gypsum slurry. The test paper specimens are laid down with the bond side uppermost on a flat surface adjacent to each other and confined by a ½ in. × ½ in. square rod frame. The wet gypsum slurry is poured onto the paper samples and then a top cover sheet is laid over and pressed down to the ½ in. thickness with a flat plate larger than the 5 in. × 15 in. paper size. The gypsum is allowed to set until the initial Vicat set of 4½ to 5½ minutes has passed, and then the framing rods and top plate are removed. After a ten minute total elapsed time the board is turned over and the 5 paper samples are then scored parallel to the 15 in. direction, about ¾ in. in from one edge. The cut is made with a sharp board knife cutting through the paper. Each piece of paper is then pulled off in a direction parallel to the 5 in. board direction. The degree of paper fibers left on the damp gypsum core is rated from 0 to 100% wet bond, 0% representing the condition when no visible fibers are left adhering to the gypsum core, and 100% representing the condition of complete fiber coverage over the surface. Wet bond testing in no way reflects the final starch bonded achieved after the board dries, but gives an indication of some of several forces, chemical bond, gypsum-to-fiber attachment, mechanical bond, and other possible forces as well.

In carrying out the tests on laboratory boards to determine the measure of dry bond, the same board that has been previously tested for wet bond is further dried in a circulating air oven or kiln at a temperature of about 360° F. for 50 minutes or until the final weight has reached 70% of the original wet weight. Final drying is accomplished at 100° F. for 16 additional hours or until a constant weight has been attained. The board sample is then scored through the back paper or opposite to the five test pieces in a direction parallel to the 15 in. length about 1 inch in from the edge. The board is then broken through the core parallel to this cut score and bent back upon itself and one side or both sides peeled back parallel to the 5 in. direction to expose the paper to core interface and to show the attachment of the paper to the gypsum core surface. The test results are given in terms of percentage of bond failure, that is, 100% being no paper to gypsum core bond, and 0% being no paper to core failure, or complete and full paper bond ply coverage to the board core surface. Humidified bond is obtained by placing the sample in a 90% relative humity at 90° F. for a period of three hours.

EXAMPLE 1 AND 2

A starch coating composition was prepared according to the invention having the following formulation:

|  | Percent | Parts by Weight |
|---|---|---|
| Tapioca Starch | 20.0 | 160.0 |
| Calcium Sulfate Hemihydrate | 10.3 | 80.0 |
| Kelzan M | 0.3 | 2.4 |
| Dow 'G' | 0.1 | .8 |
| Water | 69.6 | 556.8 |
|  | 100.0 | 800.0 Total |

The Brookfield viscosity of the above composition at the time of coating was measured as 2800 cps. The composition was coated on paper as described above by means of a roller coater. In Example 1 the composition was coated on manilla paper. In Example 2 the composition of Example 1 was coated on Newslined paper. Test gypsum boards were made as described with each type of paper. The results of tests on the board as described above are shown in Table I below.

The following composition which does not contain stucco (calcium sulfate hemihydrate) was prepared to be used as a control. The composition is disclosed in the parent application referred to above.

EXAMPLES 3 AND 4

|  | Percent | Parts by Weight |
|---|---|---|
| Tapioca Starch | 20.0 | 160.0 |
| Kelzan M | 0.3 | 2.4 |
| Dow 'G' | 0.1 | .8 |
| Water | 79.6 | 636.8 |
|  | 100.0 | 800.0 |

The composition used for Examples 3 and 4 at the time of coating had a viscosity of 1600 cps. This composition was also coated on both manila paper and Newslined paper, and coated in the same manner and with the same apparatus as described above with regard to Examples 1 and 2. The results of tests on the finished board made with the coated papers are also shown in Table I below.

TABLE I

| Starch Composition | Wet Bond | Dry* Bond % Failure | Humidified* Bond % Failure |
|---|---|---|---|
| Manila |  |  |  |
| Example 1- |  |  |  |
| Invention Composition Starch/Stucco/Kelzan | Excellent (80%-100% Fiber Attachment on Core) | 0 | 0 |
| Example 3- |  |  |  |
| Control Starch/Kelzan | Good (60-80% Fiber Attachment on Core) | 20 | 20 |
| Newslined |  |  |  |
| Example 2- |  |  |  |
| Invention Composition Starch/Stucco/Kelzan | Excellent | 0 | 0 |
| Example 4- |  |  |  |
| Control Starch/Kelzan | Good | 20 | 20 |

(*Ave. of 6 Breaks on Same Board)

As can be seen from the results shown in Table I, although good wet bond results were obtained from all the samples tested, the dry bond and humidified bond failure tests show that the board formed with the coated paper of Examples 1 and 2 according to the invention gave 0% of failures whereas the board of Examples 3 and 4 formed with the prior art coating composition gave about 20% failures in all cases.

Figure 2:
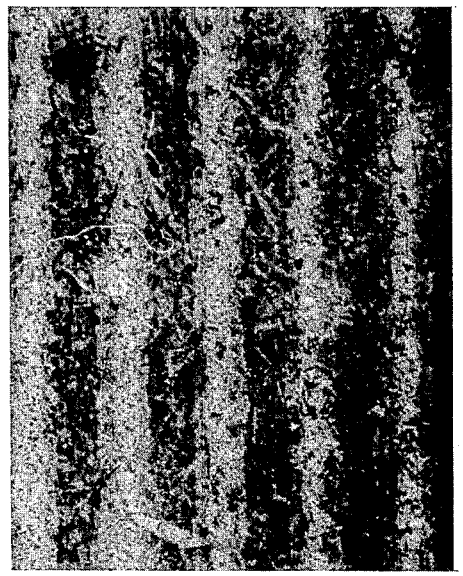
FIG. 2 is a photograph of the coated paper bond liner shown in FIG. 1, but enlarged ten times.
Figure 3:
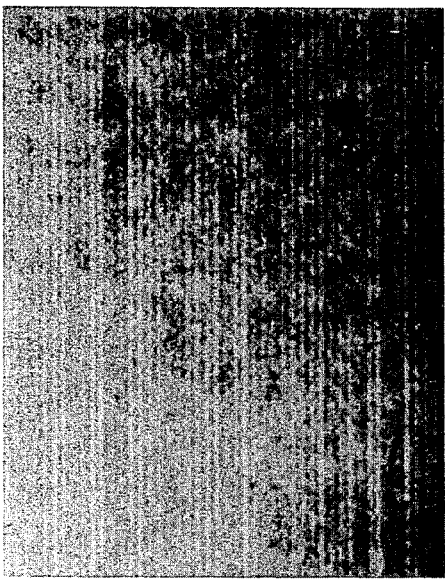
FIG. 3 is a photograph of a paper bond liner coated with starch utilizing a composition as disclosed in U.S. Ser. No. 491,097, referred to above.
Figure 4:
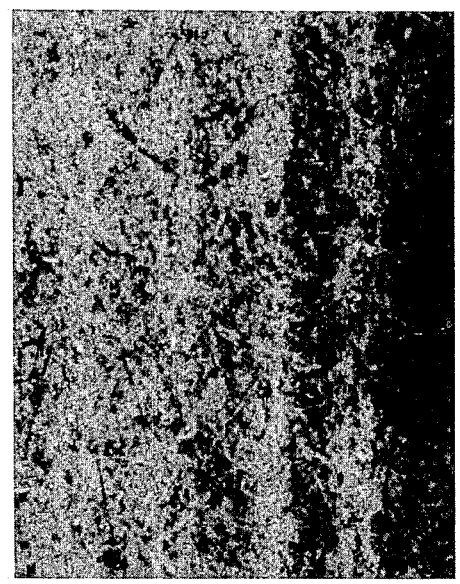
FIG. 4 is a photograph of the bond liner shown in FIG. 3, but enlarged ten times.

FIGS. 1 and 2 of the drawing are photographs of coated paper cover sheets made with the composition of Example 1. As can be seen, the lines are very sharp and the areas intermediate the lines are substantially free of coating material. This can be seen especially in FIG. 2 which is a 10× enlargement of FIG. 1 and illustrates the high resolution achieved by the composition having sharp defined outer edges of the coating lines or stripes and substantially no coating in the space intermediate the stripes or lines. As opposed to this, the photographs of the coated paper formed with the composition of Example 3 are shown in actual size in FIG. 3 and in 10× enlargement in FIG. 4. As can be seen, the resolution is much lower, and the edges of the stripes or lines more diffused and in part spreading to the spaces intermediate the lines.

One of the important factors in providing a coating composition which will provide a coating of sufficient thickness and excellent resolution is the viscosity of the composition. To determine the effect on viscosity of various compositions containing stucco with a control free of stucco, the following coating compositions were prepared:

EXAMPLE 5

| PERCENT OF TOTAL BY WEIGHT | PARTS BY WEIGHT |
|---|---|
| 20% Starch | 80g Starch |
| 0.3% Kelzan M | 1.2q Kelzan M |
| 0.1% Dow G | 0.4g Dow G |
| 80% Water | 320 ml Water |

EXAMPLE 6

| PERCENT OF TOTAL BY WEIGHT | PARTS BY WEIGHT |
|---|---|
| 20% Starch | 80g Starch |
| 10% Shoals Stucco Gypsum | 40g Gypsum |
| 0.3% Kelzan M | 1.2g Kelzan M |
| 0.1% Dow G | 0.4g Dow G |
| 70% Water | 280 ml Water |

EXAMPLE 7

| PERCENT OF TOTAL BY WEIGHT | PARTS BY WEIGHT |
|---|---|
| 20% Starch | 80g Starch |
| 15% Shoals Stucco Gypsum | 60g Gypsum |
| 0.3% Kelzan M | 1.2g Kelzan M |
| 0.1% Dow G | 0.4g Dow G |
| 65% Water | 260 ml Water |

EXAMPLE 8

| PERCENT OF TOTAL BY WEIGHT | PARTS BY WEIGHT |
|---|---|
| 20% Starch | 80g Starch |
| 20% Shoals Stucco Gypsum | 80g Gypsum |
| 0.3% Kelzan M | 1.2g Kelzan M |
| 0.1% Dow G | 0.4g Dow G |
| 60% Water | 240 ml Water |

EXAMPLE 9

| PERCENT OF TOTAL BY WEIGHT | PARTS BY WEIGHT |
|---|---|
| 20% Starch | 80g Starch |
| 30% Shoals Stucco Gypsum | 120g Gypsum |
| 0.3% Kelzan M | 1.2g Kelzan M |
| 0.1% Dow G | 0.4g Dow G |
| 50% Water | 200 ml Water |

The viscosities of the compositions of Examples 5–9 measured at various times from initial mixing are shown in Table II below.

TABLE II

| Sample Identification | 30 minutes | 3 hours | 6 hours | 24 hours |
|---|---|---|---|---|
| Example 5 | 1525 cps | 1625 cps | 1625 cps | 1700 cps |
| Example 6 | 2787.5 cps | 2850 cps | 2900 cps | 5800 cps |
| Example 7 | 4025 cps | 4150 cps | 4650 cps | 11,250 cps |
| Example 8 | 5650 cps | 5950 cps | 8800 cps | Solid |
| Example 9 | 18750 cps | 21750 cps | Solid | Solid |

It has generally been found that coating compositions having viscosities in the range from about 2500 cps. to about 8000 cps. provide excellent coating when prepared according to the invention. In the case of compositions containing smaller amounts of calcium sulfate hemihydrate, it may be necessary to let the composition stand for a period sufficient to raise the viscosity. On the other hand, for those compositions, as for example that of Example 7 the composition should be used within a short time of mixing, since when left to stand more than about 6 hours, it may attain a viscosity too high for adequate coating.

In preparing the coating compositions described above in Examples 1–9, the dry ingredients were first mixed together and then the mixture added to water under aggitation using a "Lightnin Mixer" at a medium speed for ten minutes. It was found, that, contrary to expectations, the final coating contained a major proportion of unchanged calcium sulfate hemihydrate, as determined by X-ray defraction studies. It was subsequently determined that the starch acts as an inhibitor to hydration of the hemihydrate.

It has been found that in addition to common stucco (beta-calcium sulfate hemihydrate), other forms of gypsum are suitable for practicing the invention, as for example, alpha-calcium sulfate hemihydrate, and calcium sulfate dihydrate.

The following examples illustrate the effect on the coating composition of various factors such as the composition and grain size or surface area of the gypsum, the sequence used in adding the ingredients, the intensity and length of time of stirring the mixture and of length of time of standing after mixing but before application of the composition on the paper.

EXAMPLE 10

| Formulation: | | Percent | Parts |
|---|---|---|---|
| Tapioca Starch | | 20.0 | 160.0 |
| Stucco | | 10.0 | 80.0 |
| Kelzan M | | 0.3 | 2.4 |
| Dow G | | 0.1 | 0.8 |
| Water | | 69.6 | 556.9 |
| | Total | 100.0 | 800.0 |

All the dry ingredients (starch, stucco, Kelzan M, and Dow G) were mixed together and then added to water under medium agitation (800 RPM) for a mixing period of ten minutes.

EXAMPLE 11

The formulation shown in Example 10 was prepared by combining the dry ingredients and adding them to water under high agitation (1400 RPM) and mixing for thirty minutes.

EXAMPLE 12

The formulation shown in Example 10 was utilized. Only the stucco was added to the total water and mixed for twenty minutes under high agitation (1400 RPM). The remaining ingredients were combined and added to the stucco slurry, and then mixed for an additional ten minutes under agitation.

EXAMPLE 13

The following formulation was prepared, utilizing only 7% stucco.

| Formulation: | | Percent | Parts |
|---|---|---|---|
| Tapioca Starch | | 20.0 | 160.0 |
| Stucco | | 7.0 | 56.0 |
| Kelzan M | | 0.3 | 2.4 |
| Dow G | | 0.1 | 0.8 |
| Water | | 72.6 | 580.8 |
| | Total | 100.0 | 800.0 |

All of the dry ingredients were combined together, added to water under high agitation and mixed for thirty minutes.

EXAMPLE 14

The following formulation was prepared.

| Formulation: | Percent | Parts |
|---|---|---|
| Tapioca Starch | 20.0 | 160.0 |
| Finely Ground Calcium sulfate dihydrate | 7.0 | 56.0 |
| Kelzan M | 0.3 | 2.4 |
| Dow G | 0.1 | 0.8 |
| Water | 72.6 | 580.8 |
| Total | 100.0 | 800.0 |

In this Example, 7% finely ground calcium sulfate dihydrate normally used as a gypsum setting accelerator was substituted for stucco. All the dry ingredients were combined together and added to water under high agitation and mixed for 30 minutes.

EXAMPLE 15

The following formulation was prepared:

| Formulation: | Percent | Parts |
|---|---|---|
| Tapioca Starch | 20.0 | 160.0 |
| Land Plaster | 7.0 | 56.0 |
| Kelzan M | 0.3 | 2.4 |
| Dow G | 0.1 | 0.8 |
| Water | 72.6 | 580.8 |
| Total | 100.0 | 800.0 |

In Example 15, Land Plaster, which is a calcium sulfate dihydrate of moderate particle size, was substituted for stucco. All the dry ingredients were combined together, added to water under high shear and mixed for 30 minutes.

EXAMPLE 16

The following formulation was prepared:

| Formulation: | Percent | Parts |
|---|---|---|
| Tapioca Starch | 20.0 | 160.0 |
| Kelzan M | 0.3 | 2.4 |
| Dow G | 0.1 | 0.8 |
| Water | 79.6 | 636.8 |
| Total | 100.00 | 800.0 |

The formulation of Example 16 was used as a control and does not contain any calcium sulfate additive. The dry ingredients were combined, added to water under high shear and mixed for 30 minutes.

Table III

| Example | Brookfield viscosity-Cps. 1 Hr. Standing | 4 Hrs. Standing | 24 Hrs. Standing | Gypsum Form 24 Hr. Sample X-Ray Diffraction | Pattern Definition | Board Bond Wet | Dry % Failure |
|---|---|---|---|---|---|---|---|
| Example 10 (10% Stucco-10' Mixing) | 2800 | 2900 | 5600 | 90% Hemihydrate | Ex. | Ex. | 0 |
| Example 11 (10% Stucco-30' Mixing) | 5000 | 5200 | 5300 | 90% Hemihydrate | Ex. | Ex. | 0 |
| Example 12 (two mixing stages) | 6600 | 6900 | 7600 | 90% Dihydrate | Ex. | Ex. | 0 |
| Example 13 (7% Stucco-30' Mixing) | 3800 | 3900 | 4100 | 90% Hemihydrate | Ex. | Ex. | 0 |
| Example 14 (7% Calcium sulfate dihydrate 30' Mixing) | 4100 | 4200 | 4500 | 95% Dihydrate | Ex. | Ex. | 0 |
| Example 15 (7% Land Plaster-30' Mixing) | 2000 | 2050 | 2100 | 95% Dihydrate | Poor | Good | 20 |
| Example 16 (starch only 30' mixing) | 1525 | 1625 | 1700 | — | Poor | Good | 20 |

The results shown above in Table III indicate that the viscosity of the coating composition is closely related to its ability to form starch coated paper from which gypsum board can be made having excellent pattern definition, and excellent board strength, both wet and dry. As shown, all of the compositions of Examples 10–14 form starch-coated paper of excellent pattern definition and the coated paper used to form gypsum board having excellent wet and dry board bond. The compositions used in every case were those which were allowed to stand for only one hour before coating the paper. It is thus seen that where the one hour viscosity was from 2800 to 6600, excellent products were produced. Viscosities of as high as 7600, as for example that of Example 12 which was permitted to stand for 24 hours, may also be used but the coating process becomes more difficult. The compositions of Examples 15 and 16 having viscosities of 2000 or under form coated paper of poor pattern definition and, although they exhibited good wet bond, the dry bond failure was unacceptable at 20%.

Even the composition of Example 15 which exhibited a viscosity of 2100 cps. after standing for 24 hours was too thin to provide good definition and good dry bond. An explanation for the poor performance of the composition of Example 15 is that the product was common landplaster of the type used for calcining, whereas the dihydrate of Example 14 was very finely ground and of the type normally used as a gypsum set accelerator.

It was further found that, although the dihydrate form of gypsum may be used to form the coating composition, somewhat better results are obtained by using the hemihydrate form and by premixing the dry ingredients prior to adding water so that the presence of the starch cause the hemihydrate to remain in that form even after standing and even after coating of the paper.

In order to determine the lower limits of calcium sulfate hemihydrate addition which would still provide a good starch-coating composition were prepared utilizing 20% starch in each example but varying the calcium sulfate hemihydrate from 0 to 10%. Mixing was carried out for 30 minutes at high shear and the coating composition then permitted to stand for an additional hour, at which time the viscosities of the compositions were measured.

TABLE IV

| Example | % Calcium Sulfate Hemihydrate | % Starch | Viscosity cps after 1 Hr. |
|---|---|---|---|
| Example 17 | 0 | 20 | 2200 |
| Example 18 | 1 | 20 | 2625 |
| Example 19 | 3 | 20 | 3025 |
| Example 20 | 5 | 20 | 3400 |
| Example 21 | 10 | 20 | 4650 |

As can be seen from the results in Table IV, which sets out percent of ingredients by weight a composition containing as low as 1% calcium sulfate hemihydrate provided a composition having a viscosity of 2625 cps. A composition having as little as 0.75% and providing a viscosity of about 2500 cps. also can be used to form starch coated paper which may be used to form gypsum wallboard having excellent wet and dry bond properties.

The viscosities of the coating compositions of the invention may range from at least about 2500 cps to about 8000 cps. However, compositions having higher viscosities may be applied by means other than roller coating.

It has also been found that although dihydrate gypsum may be utilized, hemihydrate gypsum provides superior coating compositions at comparable or greater viscosities. It can also be seen that the particle surface magnitude plays an important part in attaining the proper viscosity, since the medium ground dihydrate gypsum or land plaster provides a considerably less effective coating composition that the very finely ground dihydrate which is conventionally used as an accelerator for setting a gypsum slurry.

The data above also shows that when high shear mixing at extended periods is utilized, the viscosity reaches a maximum early and does not change materially after being allowed to stand for a period of time.

In listing the percentage or parts of the various ingredients in the Tables above, the reference in every case is to percentage or parts by weight. In the case of an aqueous composition, the percentage is by weight of the entire composition including the water.

The material listed as Kelzan M is a conventional dispersing agent comprising xanthan gum.

Dow G is a conventional preservative having the chemical name sodium pentachlorophenate.

The starch is preferably a raw starch and may be present in an amount from about 5% to about 30% by weight of the coating composition.

The calcium sulfate such as calcium sulfate hemihydrate may be present in an amount from about 0.75% to about 30% of the weight of the coating composition.

It is to be understood that the invention is not to be limited to the exact details of composition, materials, or operation shown or described, as obvious modifications and equivalents will be apparent to one skilled in the art.

Invention is claimed as follows:

1. A process for producing a starch-coated paper cover sheet having a bond liner and being suitable for use in manufacturing gypsum wallboard, which comprises:
   (a) preparing a coating composition comprising water, non-migratory raw starch, and finely particulate calcium sulfate, and
   (b) applying said coating composition on the surface of said bond liner in a pattern having said coating composition at limited areas of said bond liner while leaving substantial areas free of said composition.

2. A process according to claim 1, wherein said calcium sulfate is calcium sulfate dihydrate.

3. A process according to claim 1, wherein said calcium sulfate is calcium sulfate hemihydrate.

4. A process according to claim 1, wherein the viscosity of said coating composition is from about 2500 to about 8000 cps.

5. A method according to claim 1, wherein said calcium sulfate is present in an amount of from about 0.75% to about 30% by weight of said coating composition.

6. A process according to claim 1, wherein said starch is present in an amount from about 5% to about 30% by weight of said composition.

7. A process according to claim 1, wherein said coating is applied by a roller coater.

8. A process according to claim 7, wherein said coating is applied in the form of parallel spaced-apart stripes or lines.

9. A process according to claim 8, wherein said parallel stripes or lines and the space intermediate said stripes or lines are of substantially equal widths.

10. A process according to claim 7, wherein said parallel stripes or lines are applied at about 16 lines per inch.

11. A process according to claim 1, wherein said coating composition is dried after it is applied to said paper cover sheet.

12. A process according to claim 1, wherein said coating composition additionally includes a dispersing agent.

13. A process according to claim 12, wherein said dispersing agent comprises xathane gum.

14. A process according to claim 1, wherein said coating composition additionally contains a preservative.

15. A process according to claim 14, wherein said preservative is sodium pentachlorophenate.

16. A starch-coated paper cover sheet having a bond liner and being suitable for use in manufacturing gypsum wallboard, said bond liner having a coating composition on the surface thereof in a pattern having said coating composition at limited areas of said bond liner while leaving substantial areas free of said composition, said coating composition comprising water, non-migratory raw starch, and finely particulate calcium sulfate.

17. A paper cover sheet according to claim 16, wherein said calcium sulfate is calcium sulfate dihydrate.

18. A paper cover sheet according to claim 16, wherein said calcium sulfate is calcium sulfate hemihydrate.

19. A paper cover sheet according to claim 16, wherein the viscosity of said coating composition is from about 2500 to about 8000 cps.

20. A paper cover sheet according to claim 16, wherein said calcium sulfate is present in an amount of from about 0.75% to about 30% by weight of said coating composition.

21. A paper cover sheet according to claim 16, wherein said starch is present in an amount from about 5% to about 30% by weight of said composition.

22. A paper cover sheet according to claim 16, wherein said coating has been applied by a roller coater.

23. A paper cover sheet according to claim 16, wherein said coating is in the form of parallel spaced-apart stripes or lines.

24. A paper cover sheet according to claim 23, wherein said parallel stripes and the space intermediate said stripes or lines are of substantially equal widths.

25. A paper cover sheet according to claim 22, wherein said parallel stripes or lines are present at about 16 lines per inch.

26. A paper cover sheet according to claim 16, wherein said coating composition is dry.

27. A paper cover sheet according to claim 16, wherein said coating composition additionally includes a dispersing agent.

28. A paper cover sheet according to claim 27, wherein said dispersing agent comprises xathane gum.

29. A paper cover sheet according to claim 16, wherein said coating composition additionally contains a preservative.

30. A paper cover sheet according to claim 29, wherein said preservative is sodium pentachlorophenate.

31. A process for producing gypsum wallboard comprising the following steps:
   (a) providing at least one paper cover sheet having a bond liner and applying a coating of a non-migratory raw starch adhesive composition to provide a pattern having said starch adhesive composition at limited areas of said bond liner while leaving substantial areas free of said adhesive composition, said adhesive composition comprising water, starch and finely particulate calcium sulfate, and
   (b) casting an aqueous slurry of calcium sulfate hemihydrate on said paper cover sheet over said bond liner with the water from said aqueous slurry establishing wet bonding between said slurry and the uncoated portions of said bond liner, and
   (c) setting said slurry to form a core and setting said starch adhesive composition to establish an adhesive bond between said core and said paper cover sheet at the limited areas containing said starch adhesive.

32. A process according to claim 31, wherein said calcium sulfate is calcium sulfate dihydrate.

33. A process according to claim 31, wherein said calcium sulfate is calcium sulfate hemihydrate.

34. A process according to claim 31, wherein the viscosity of said coating composition is from about 2500 to about 8000 cps.

35. A method according to claim 31, wherein said calcium sulfate is present in an amount of from about 0.75% to about 30% by weight of said coating composition.

36. A process according to claim 31, wherein said starch is present in an amount from about 5% to about 30% by weight of said composition.

37. A process according to claim 31, wherein said coating is applied by a roller coater.

38. A process according to claim 37, wherein said coating is applied in the form of parallel spaced-apart stripes or lines.

39. A process according to claim 38, wherein said parallel stripes or lines and the space intermediate said stripes or lines are of substantially equal widths.

40. A process according to claim 37, wherein said parallel stripes or lines are applied at about 16 lines per inch.

41. A process according to claim 31, wherein said coating composition is dried after it is applied to said paper cover sheet.

42. A process according to claim 31, wherein said coating composition additionally includes a dispersing agent.

43. A process according to claim 42, wherein said dispersing agent comprises xathane gum.

44. A process according to claim 31, wherein said coating composition additionally contains a preservative.

45. A process according to claim 44, wherein said preservative is sodium pentachlorophenate.

46. Gypsum wallboard comprising:
   (a) a core comprising rehydrated calcium sulfate hemihydrate, and
   (b) a cover sheet affixed to each surface of said core comprising:
      (1) a bond liner having a coating composition thereon comprising non-migratory raw starch and finely particulate calcium sulfate, said coating composition being present in a pattern having said coating composition at limited areas of said bond liner while leaving substantial areas free of said starch adhesive composition, said coating composition providing an adhesive bond between said core and said paper cover sheets at the limited areas containing said starch adhesive.

47. Gypsum wallboard according to claim 46, wherein said calcium sulfate is calcium sulfate dihydrate.

48. Gypsum wallboard according to claim 46, wherein said calcium sulfate is calcium sulfate hemihydrate.

49. Gypsum wallboard according to claim 46, wherein the viscosity of said coating composition is from about 2500 to about 8000 cps.

50. Gypsum wallboard according to claim 46, wherein said calcium sulfate is present in an amount of from about 0.75% to about 30% by weight of said coating composition.

51. Gypsum wallboard according to claim 46, wherein said starch is present in an amount from about 5% to about 30% by weight of said composition.

52. Gypsum wallboard according to claim 46, wherein said coating is applied by a roller coater.

53. A process according to claim 52, wherein said coating is in the form of parallel spaced-apart stripes or lines.

54. Gypsum wallboard according to claim 53, wherein said parallel stripes or lines and the space intermediate said stripes or lines are of substantially equal widths.

55. Gypsum wallboard according to claim 52, wherein said parallel stripes or lines are applied at about 16 lines per inch.

56. Gypsum wallboard according to claim 52, wherein said coating composition is dried after it is applied to said paper cover sheet.

57. Gypsum wallboard according to claim 46, wherein said coating composition additionally includes a dispersing agent.

58. Gypsum wallboard according to claim 57, wherein said dispersing agent comprises xathane gum.

59. Gypsum wallboard according to claim 46, wherein said coating composition additionally contains a preservative.

60. Gypsum wallboard according to claim 59, wherein said preservative is sodium pentachlorophenate.

* * * * *